March 29, 1927.
H. C. MUMMERT
AEROPLANE LANDING GEAR
Filed Dec. 17, 1925
1,622,799
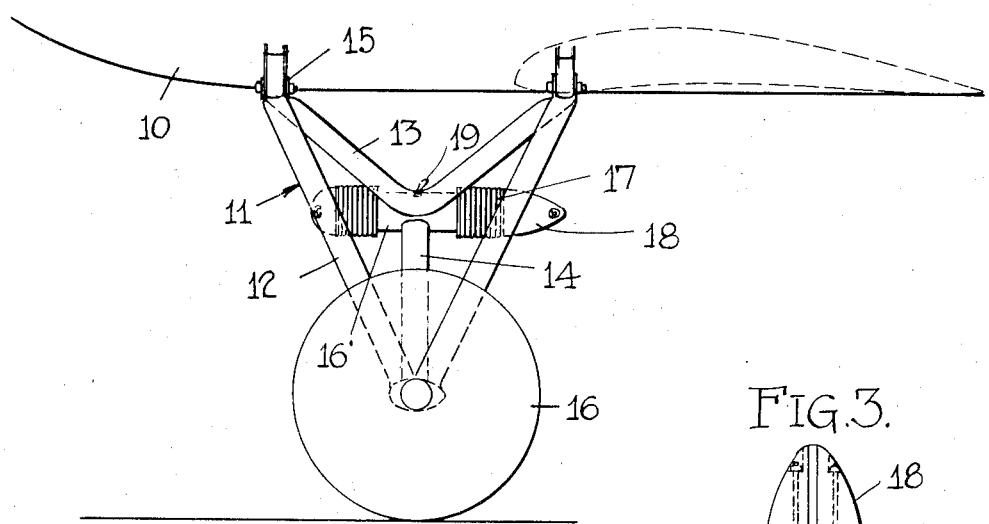
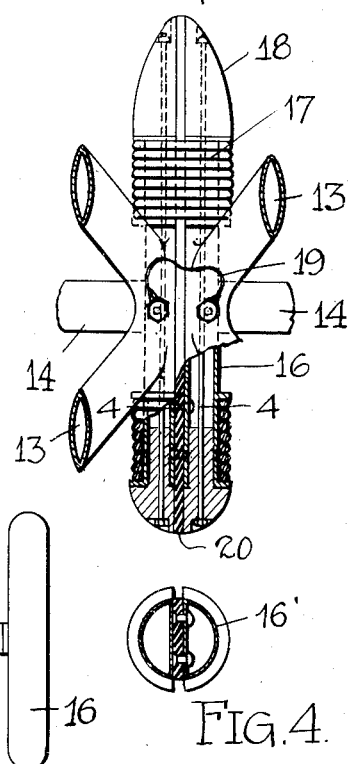
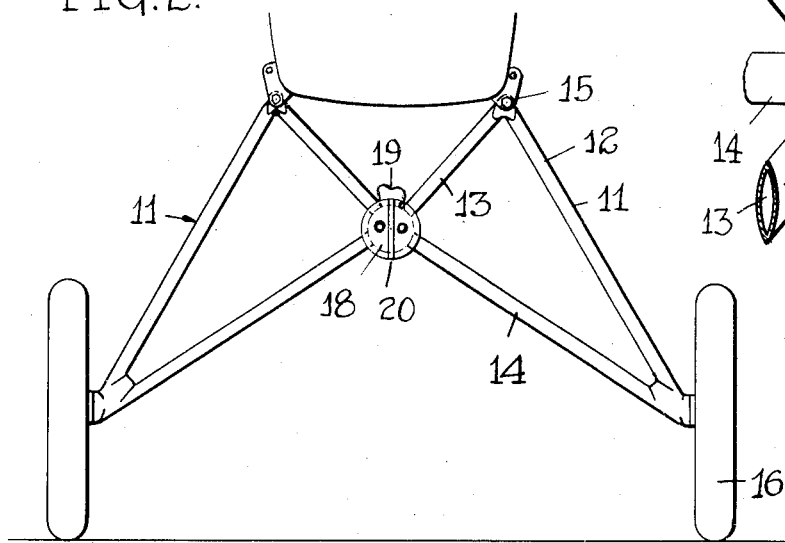
INVENTOR
HARVEY C. MUMMERT.
BY *W. E. Kaer Jr.*
ATTORNEY Patented Mar. 29, 1927.

1,622,799

UNITED STATES PATENT OFFICE.

HARVEY C. MUMMERT, OF HAMMONDSPORT, NEW YORK, ASSIGNOR TO AERIAL SERVICE CORPORATION, A CORPORATION OF NEW YORK.

AEROPLANE LANDING GEAR.

Application filed December 17, 1925. Serial No. 75,896.

My invention relates to aeroplane landing gears and is characterized by improvements in the construction and relative arrangement of the several landing gear parts.

The framing of the landing gear comprises relatively movable framed structures which are of identical construction and are preferably interchangeable, and which are pivotally fastened to the aeroplane, one at each side of its fore and aft axis. Beneath the pivot points, and in substantially the longitudinal vertical plane of said axis, said framed structures are brought into abutting engagement and tied together, the tie-connection being so arranged and constructed as to yieldingly resist relative movement of said frames.

A landing gear thus characterized is of simple construction, is inexpensive to manufacture, is accessible, is sturdy, is economically serviced, and is unusually "clean," i. e., it offers but little head resistance or drag.

Other objects and advantages of the invention will be hereinafter set forth.

In the drawings, wherein like reference characters denote like or corresponding parts, Fig. 1 is a side elevation of the landing gear;

Fig. 2 is a front elevation of the landing gear;

Fig. 3 is a plan view, part in section, of the shock absorber unit of the landing gear, and Fig. 4 is a section on the line 4—4 of Fig. 3.

In the embodiment of the invention selected for illustration only the under portion of the aeroplane body or fuselage to which the landing gear is attached, is shown. Such fuselage or body portion is designated as 10. As previously intimated, the landing gear per se, preferably comprises substantially identical framed structures 11—11. Said framed structures, viewed from the front or rear, are triangularly formed. Each comprises a substantially V-shaped compression strut 12, a correspondingly shaped inner strut 13 and a centrally located single tension strut 14. Each said frame structure 11 at one of the included angles of the triangle thereof, is pivotally fastened as at 15 to the fuselage or body 10, the pivot axes in each instance being extended in a fore and aft direction and located (see Fig. 2) symmetrically at opposite sides of the longitudinal vertical plane of the fore and aft axis of the machine.

At the outer included angle of each said frame structure the landing device is mounted. If a land machine, the landing device takes the form of a wheel 16 as herein shown. If a hydroairplane or seaplane, the landing device instead of being a wheel such as 16, takes the form of a suitable pontoon or float.

At the third included angle of the triangle of each frame structure, said frame structures are brought into abutting engagement, the point of contact between said frame structures being preferably disposed in substantially the longitudinal vertical plane of the fore and aft axis of the machine. At said third included angle, each frame structure 11 is enlarged longitudinally as indicated at 16' to provide in effect suitable arms or extensions over and around which the shock absorber cords or elastics 17 are wound or laced. If desired, as indicated in Fig. 3, the enlargement 16' may be suitably faired as at 18 to reduce the head resistance or drag.

In the operation of the landing gear, and under the impact of landing, the frame structures 11 are yieldingly displaced. Such relative movement of the frame structure is at all times resisted by the shock absorber cords or elastics 17. Under all operating conditions, the frame structures 11 move outwardly and upwardly about the fore and aft pivot axes 15. If desired, a stop wire 19 may be provided to limit the relative movement of said frame structures and a rubber insert 20 provided to partially absorb rebound shocks.

It will be further noted, upon reference to Fig. 1, that each frame structure is symmetrically formed about a vertical plane passing thru its transverse center line. This symmetry of construction is desirable in that provision is made for the interchange of the frame structures as desired. Thus characterized, a landing gear of the character described, may be economically serviced if damaged for any cause. To use a right frame structure in place of a left or vice versa, it is only necessary that its fairing 18 be reversed.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. A landing gear for aeroplanes including a pair of substantially triangular relatively movable frames, and a shock absorber connection between said frames for resisting such relative movement.

2. A landing gear for aeroplanes including a pair of relatively laterally movable and structurally rigid substantially triangular frames, and a shock absorber connection between said frames for resisting such relative lateral movement.

3. A landing gear for aeroplanes including a pair of relatively movable substantially triangular frames, each said frame being pivotally mounted and said pivot axes being disposed respectively at one of the included angles of each said triangle, and a yielding connection between said frames for resisting such relative movement, said connection at its opposite ends engaging said frames at corresponding other included angles thereof.

4. A landing gear for aeroplanes including a pair of relatively movable structurally rigid substantially triangular frames, each said frame being pivotally mounted and said pivot axes being disposed respectively at one of the included angles of each said triangle, and a yielding connection between said frames for resisting such relative movement, said connection at its opposite ends engaging said frames at corresponding other included angles thereof to normally hold said frames in abutting engagement.

5. A landing gear for aeroplanes including a pair of relatively movable substantially triangular frames pivotally fastened to said aeroplane, the pivot axes in each instance being extended in a fore and aft direction and disposed respectively at one of the included angles of each said triangle, and a shock absorber connection uniting said frames at other and different corresponding included angles thereof for resisting such relative movement.

6. A landing gear for aeroplanes comprising separate relatively movable frames adapted to normally bear one against the other, together with means for yieldingly fastening said frames together at said point of contact to resist such relative movement.

In testimony whereof I hereunto affix my signature.

HARVEY C. MUMMERT.